United States Patent
Lee et al.

(10) Patent No.: US 10,454,135 B2
(45) Date of Patent: Oct. 22, 2019

(54) BATTERY CELL IN WHICH GELATION ELECTROLYTE SOLUTION COMPONENT IS INCLUDED IN PORE OF SEPARATOR CONFIGURING ELECTRODE ASSEMBLY

(71) Applicant: LG Chem, Ltd., Seoul (KR)

(72) Inventors: Ji Eun Lee, Daejeon (KR); Hee Seok Jeong, Daejeon (KR); Sei Woon Oh, Daejeon (KR); Eun Ju Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/744,488

(22) PCT Filed: Oct. 7, 2016

(86) PCT No.: PCT/KR2016/011219
§ 371 (c)(1),
(2) Date: Jan. 12, 2018

(87) PCT Pub. No.: WO2017/061807
PCT Pub. Date: Apr. 13, 2017

(65) Prior Publication Data
US 2018/0212273 A1  Jul. 26, 2018

(30) Foreign Application Priority Data
Oct. 7, 2015  (KR) .................. 10-2015-0140927

(51) Int. Cl.
*H01M 10/0565* (2010.01)
*H01M 10/0525* (2010.01)
(Continued)

(52) U.S. Cl.
CPC ....... *H01M 10/0565* (2013.01); *H01M 2/145* (2013.01); *H01M 2/166* (2013.01);
(Continued)

(58) Field of Classification Search
CPC ..... H01M 10/0565; H01M 2300/0085; H01M 10/0585; H01M 10/0525; H01M 10/052;
(Continued)

(56) References Cited

U.S. PATENT DOCUMENTS

| 5,858,264 A * | 1/1999 | Ichino ................. H01M 10/052 |
| | | 204/252 |
| 2003/0118895 A1* | 6/2003 | Oh ...................... H01M 2/1653 |
| | | 429/142 |

(Continued)

FOREIGN PATENT DOCUMENTS

| JP | 2000268867 A | 9/2000 |
| JP | 2003223926 A | 8/2003 |

(Continued)

OTHER PUBLICATIONS

International Search Report for Application No. PCT/KR2016/011219 dated Jan. 16, 2017.

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

The present invention provides a battery cell including: an electrode assembly having a structure in which a separator is interposed between a cathode and an anode, wherein the separator is formed with a plurality of pores and the pores include a gelation electrolyte solution component.

20 Claims, 2 Drawing Sheets

(51) Int. Cl.
  *H01M 10/0585* (2010.01)
  *H01M 2/16* (2006.01)
  *H01M 10/052* (2010.01)
  *H01M 2/14* (2006.01)

(52) U.S. Cl.
  CPC ....... *H01M 2/1653* (2013.01); *H01M 10/052* (2013.01); *H01M 10/0525* (2013.01); *H01M 10/0585* (2013.01); *H01M 2300/0025* (2013.01); *H01M 2300/0085* (2013.01); *Y02T 10/7011* (2013.01)

(58) Field of Classification Search
  CPC ......... H01M 2300/0025; H01M 2/166; H01M 2/145; H01M 2/1653
  See application file for complete search history.

(56) References Cited

U.S. PATENT DOCUMENTS

| | | | |
|---|---|---|---|
| 2011/0143184 A1* | 6/2011 | Mccarthy | H01M 2/1613 429/145 |
| 2011/0195314 A1 | 8/2011 | Yu et al. | |
| 2013/0052523 A1* | 2/2013 | Yamada | H01M 10/0567 429/199 |
| 2015/0318570 A1* | 11/2015 | Choi | H01M 10/0565 429/144 |

FOREIGN PATENT DOCUMENTS

| | | | |
|---|---|---|---|
| JP | 2005235684 A | | 9/2005 |
| JP | 2008287932 A | | 11/2008 |
| JP | 2012146492 | * | 8/2012 |
| JP | 2012146492 A | | 8/2012 |
| KR | 20050116338 A | | 12/2005 |
| KR | 20060021222 A | | 3/2006 |
| KR | 20090012726 A | | 2/2009 |
| KR | 20100016919 A | | 2/2010 |
| KR | 20110137567 A | | 12/2011 |
| KR | 20140092158 A | | 7/2014 |
| KR | 20150007907 A | | 1/2015 |
| KR | 20150016897 A | | 2/2015 |
| KR | 20150051979 A | | 5/2015 |
| WO | WO2014112776 | * | 7/2014 |

* cited by examiner

BATTERY CELL IN WHICH GELATION ELECTROLYTE SOLUTION COMPONENT IS INCLUDED IN PORE OF SEPARATOR CONFIGURING ELECTRODE ASSEMBLY

CROSS-REFERENCE TO RELATED APPLICATONS

The present application is a national phase entry under 35 U.S.C. § 371 of International Application No. PCT/KR2016/011219 filed Oct. 7, 2016, which claims priority from Korean Patent Application No. 10-2015-0140927 filed on Oct. 7, 2015, all of which are incorporated herein by reference.

TECHNICAL FIELD

The present invention relates to a battery cell in which a gelation electrolyte solution component is included in a pore of a separator configuring an electrode assembly.

BACKGROUND

In recent years, the price of energy sources has been increased due to the depletion of fossil fuels and the interest in environmental pollution has been increased. Therefore, the demand for environmentally friendly alternative energy sources has become an indispensable factor for future life. Various studies on power generation technologies such as nuclear power, solar power, wind power, and tidal power have been continuing, and power storage devices for more efficient use of such generated energy have also been attracting much attention.

In particular, as the technology development and demand for mobile devices are increasing, the demand for batteries as energy sources is rapidly increasing, and many studies on batteries meeting various demands have been conducted.

Typically, in terms of the shape of the battery, the demand for a prismatic secondary battery and a pouch type secondary battery that can be applied to products such as mobile phones having a small thickness is increased, and in terms of the material, the demand for a lithium secondary battery such as a lithium ion battery and a lithium ion polymer battery having merits such as a high energy density, a discharge voltage, and output stability is increased.

Also, the secondary battery is classified according to how to construct an electrode assembly having a structure in which a cathode, an anode, and a separator interposed between the cathode and the anode are stacked. Typically, an example of the secondary battery may include a jelly-roll type (winding type) electrode assembly having a winding structure in which long sheet-like cathodes and anodes are wound having a separator interposed therebetween, a stack type electrode assembly in which a plurality of cathodes and anodes cut in units of a predetermined size are sequentially stacked having a separator interposed therebetween or the like. In recent years, in order to solve the problems of the jelly-roll type electrode assembly and the stack type electrode assembly, as the electrode assembly having a progressive structure in which the jelly-roll type and the stack type are mixed, a stack/folding type electrode assembly having a structure in which unit cells in which cathodes and anodes in a predetermined unit are stacked having a separator interposed therebetween are sequentially wound with being located on a separation film has been developed.

In addition, the secondary battery is classified into a cylindrical battery and a prismatic battery in which the electrode assembly is embedded in a cylindrical or prismatic metal can according to the shape of the battery case, and a pouch type battery in which the electrode assembly is embedded in a pouch-like case of an aluminum laminate sheet.

In particular, recently, a pouch type battery having a structure in which a stack type or a stack/folding type electrode assembly is embedded in a pouch type battery case of an aluminum laminate sheet has attracted much attention due to low manufacturing cost, small weight, easy shape change, and the like and the usage thereof is gradually increasing.

Generally, the secondary battery is completed by manufacturing the electrode by coating and drying an electrode mixture in which an electrode active material, a conductive agent, a binder, etc. are mixed on an electrode current collector and stacking the manufactured electrode along with the separator and then embedding the electrode and the separator in the battery case along with an electrolyte solution and sealing it.

At this time, the separator is an insulating thin film having high ion transmission and mechanical strength, and has a structure including pores having a predetermined diameter. More specifically, a sheet, a non-woven fabric or the like made of olefin based polymer such as chemical-resistance and hydrophobic polypropylene, glass fiber, polyethylene or the like are used. When a solid electrolyte such as polymer is used as an electrolyte, the solid electrolyte may also serve as the separator.

However, when a size of the pores is large or porosity is high, the separator may be advantageous in movement of lithium ions, but the insulation performance exerted between the cathode and the anode may deteriorate, such that the safety of the battery may deteriorate.

On the other hand, when the size of the pore of the separator is too small or the porosity is too low, as the charge and discharge cycle of the battery is progressed, by-products generated due to the decomposition of the electrolyte solution or the like close the pores of the separator, such that the electrical performance of the battery may deteriorate.

In addition, when the solid electrolyte serves as the separator, there is an advantage that the gas generation in the battery is reduced or the safety is improved, but the impregnability property and the ion conductivity are lower than those of the liquefied electrolyte solution, such that the performance of the battery may deteriorate.

Therefore, a need for a technology capable of fundamentally solving such problems is increased.

Technical Problem

The present invention has been made to solve the above-mentioned problems of the prior art and the technical problems that have been requested from the past The inventors of this application completed the present invention having a structure (which will be described below) in which a gelation electrolyte solution component are included in a plurality of pores formed on a separator by repeating in-depth studies and various experiments. By this structure, even if the separator having the large-diameter pore is used, the insulation between the cathode and the anode is improved to secure the safety of the battery cell and prevent the ion conductivity from deteriorating due to the closure of the pores, the high electrolyte solution impregnability is maintained to prevent the performance of the battery cell from deteriorating, and the separator from is prevented from being thermally contracted due to the change in temperature of the battery cell as compared to the structure including only the liquefied electrolyte solution to improve the stability.

Technical Solution

An exemplary embodiment of the present invention provides a battery cell.

The battery cell may include an electrode assembly having a structure in which a separator is interposed between a cathode and an anode, and may be a structure in which the separator is formed with a plurality of pores and the pores include a gelation electrolyte solution component.

Therefore, even if the separator having a large-diameter pore is used, insulation between the cathode and the anode is maintained to secure safety of the battery cell and prevent ion conductivity from deteriorating due to a closure of the pores, high electrolyte solution impregnability is maintained to prevent performance of the battery cell from deteriorating, and the separator is prevented from being thermally contracted due to a change in temperature of the battery cell as compared to a structure including only a liquefied electrolyte solution to improve the stability.

In one specific example, the pores formed on the separator may have an average diameter of 0.01 µm to 100 µm, and more specifically, an average diameter of 1 µm to 10 µm.

In addition, the separator may have porosity of 40% to 90%.

If the average diameter and the porosity of the pores are too small beyond the above range, the effect of preventing the ion conductivity from deteriorating can not be exhibited, or the gelation electrolyte component can not be sufficiently included and therefore the electrolyte solution impregnability may deteriorate.

On the contrary, if the average diameter and the porosity of the pores are too large beyond the range, the electrical insulation deteriorates even if the gelation electrolyte solution component is included in the pores, and therefore the safety of the battery cell may deteriorate.

Meanwhile, the electrolyte solution component may be polymerized or cured after the separator is impregnated into a mixed liquid including an electrolyte solution component in a liquefied monomer and/or oligomer state and an polymerization initiator to insert the mixed liquid into the pores of the separator.

More specifically, the electrolyte solution component included in the pores of the separator does not have a structure that it is gelated and then is inserted into the pores, but may have a structure in which the mixed liquid including the electrolyte solution component in the liquefied monomer and/or oligomer state and the polymerization initiator is inserted into the pores of the separator and then polymerized or cured to be stably gelated within the pores of the separator.

At this time, the pores of the separator may be connected to each other in a three-dimensional network structure, so that the mixed liquid including the electrolyte solution component in the liquefied monomer and/or oligomer state and the polymerization initiator can be more easily inserted into the pores of the separator.

According to the above structure, the electrolyte solution components are inserted into the pores of the separator and then polymerized or cured, and then are connected to each other in the three-dimensional network structure, thereby improving the structural stability Here, the pores of the separator each may have the independently formed structure.

In one specific example, the electrolyte solution component in the liquefied monomer and/or oligomer state is at least any one selected from the group consisting of a polyethylene derivative, a polyethylene oxide derivative, a polypropylene oxide derivative, a phosphate ester polymer, a poly agitation lysine, a polyester sulfide, a polyvinyl alcohol, a polyvinylidene fluoride, or a polymer including an ionic dissociation group.

However, the electrolyte solution component is not limited thereto, but specifically, may include at least any one selected from the group consisting of nitride, halide, and sulfate of Li of $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

That is, the electrolyte solution component may include the same component as an organic solid electrolyte or an inorganic solid electrolyte.

In addition, the polymerization initiator can gelate the electrolyte solution component in the liquefied monomer and/or oligomer state by heat or light applied from the outside.

In other words, the polymerization initiator may serve to polymerize or cure the electrolyte solution component in the liquefied monomer and/or oligomer state by an external stimulus, specifically, gelate the electrolyte solution component by heat or light, and more specifically, the polymerization initiator may gelate the electrolyte solution component by heat in consideration of the fact that the separator is interposed between the cathode and the anode.

Here, the liquefied electrolyte solution component inserted into the pores of the separator may be a structure which it is polymerized or cured for 1 hour to 20 hours in a temperature range of 40° C. to 90° C.

If the electrolyte solution component is polymerized or cured for a short period of time in an excessively low temperature range beyond the above range, the separator may not be impregnated in the state in which the mixed liquid including the electrolyte solution component is maintained in the liquid state, whereas if the electrolyte solution component is polymerized or cured over a long period of time in an excessively high temperature range, the cost and time required to polymerize or cure the electrolyte solution component may increase.

Further, the polymerization initiator may be polymerized or cured under the temperature and time condition to be stably gelated in the pores of the separation membrane, and at the same time, the component thereof is not particularly limited as long as it does not hinder the electrochemical performance of the battery cell, and specifically, may include at least any one selected from the group consisting of benzoyl peroxide (BPO), acetyl peroxide, dilauryl peroxide, di-tertbutylperoxide, cumyl hydroperoxide, hydrogen peroxide, 2,2-azobis (2-cyanobutane), 2,2-azobis (methylbutyronitrile), azobis (isobutyronitrile) (AIBN), and azobis-dimethyl-valeronitrile (AMVN).

On the other hand, the content of the polymerization initiator may be 0.01 wt % to 5 wt % with respect to the electrolyte solution component in the liquefied monomer and/or oligomer state.

If the content of the polymerization initiator is less than 0.01 wt % with respect to the electrolyte solution component in the liquefied monomer and/or oligomer state, the electrolyte solution component in the liquefied monomer and/or oligomer state may not be sufficiently polymerized or cured, and if the content of the polymerization initiator exceeds 5 wt % and is excessively included, the content of the electrolyte solution component is relatively reduced, so that the desired effect may not be exhibited.

In one specific example, the battery cell may be a structure in which it further includes the liquefied electrolyte solution.

At this time, the liquefied electrolyte solution may be a structure in which it is sealed in a battery case in a state where the electrode assembly is impregnated.

More specifically, the battery cell may include the electrode assembly having the structure in which the separator including the electrolyte solution component gelated in the plurality of pores is interposed between the cathode and the anode, may be the structure in which a separate liquefied electrolyte solution is sealed in the battery case in the state in which the electrode assembly is impregnated, and may further include a liquefied electrolyte solution in addition to the gelation electrolyte solution component.

Therefore, the battery cell may improve the impregnability of the electrode assembly with respect to the electrolyte solution, can supplement the additional electrolyte solution in addition to the gelation electrolyte solution component, thereby improving the electrical performance of the battery cell.

In this case, the liquefied electrolyte solution may be a different component from the gelation electrolyte solution component located in the pores of the separator, and specifically, may be at least any one selected from the group consisting of N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydroxy franc, 2-methyltetrahydrofuran, dimethylsulfoxide, 1,3-dioxolane, formamide, dimethylformamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, and ethyl propionate In one specific example, the type of the battery cell is not particularly limited, but specific examples thereof include a lithium secondary battery such as a lithium ion battery and a lithium ion polymer battery having advantages such as a high energy density, a discharge voltage, and output stability.

Generally, the lithium secondary battery includes a cathode, an anode, a separator, a lithium salt containing nonaqueous electrolyte solution.

The cathode is prepared, for example, by coating and drying a mixture of a cathode active material, a conductive material and a binder on a cathode current collector, and optionally, a filler may be further added to the mixture.

The cathode active material may be a layered compound such as lithium cobalt oxide ($LiCoO_2$) or lithium nickel oxide ($LiNiO_2$) or a compound substituted into one or more transition metal; lithium manganese oxides such as $Li_{1+x}Mn_{2-x}O_4$ (where x is 0 to 0.33), $LiMnO_3$, $LiMn_2O_3$, $LiMnO_2$ and the like; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxide represented by the chemical formula $LiNi_{1-x}M_xO_2$ (where M=Co, Mn, Al, Cu, Fe, Mg, B or Ga and x=0.01 to 0.3); lithium manganese composite oxide represented by the chemical formula $LiMn_{2-x}M_xO_2$ (where M=Co, Ni, Fe, Cr, Zn or Ta and x=0.01 to 0.1) or $Li_2Mn_3MO_8$ (where M=Fe, Co, Ni, Cu or Zn); $LiMn_2O_4$ in which a part of Li in the chemical formula is substituted into alkaline earth metal ion; a disulfide compound; $Fe_2(MoO_4)_3$, and the like, but not limited thereto.

The conductive material is generally added as 1 to 30 wt % based on the entire weight of mixture including the cathode active material. Such a conductive material is not particularly limited as long as it has conductivity without causing the chemical change in the battery, and examples thereof may include graphite such as natural graphite and artificial graphite; carbonblack such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; conductive materials such as polyphenylene derivatives and the like.

The binder is a component that assists in bonding between the active material and the conductive material and bonding to the current collector, and is usually added in an amount of 1 to 30 wt % based on the total weight of the mixture including the cathode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the lik The filler is optionally used as a component for suppressing the expansion of the cathod, and is not particularly limited as long as it is a fibrous material without causing a chemical change in the battery. Examples of the filler may include olefin based polymers such as polyethylene and polypropylene; fibrous materials such as glass fiber, carbon fiber and the like.

The anode is manufactured by coating and drying the anode active material on the anode current collector, and optionally, may further include components as described above as needed.

Examples of the anode active material may include carbon such as non-graphitized carbon and graphite-based carbon; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements of groups I, II, and III in a periodic table, halogen; $0 < x \le 1$; $1 \le y \le 3$; $1 \le z \le 8$); lithium metal; lithium alloy; silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials and the like.

In order to improve the safety of the battery, the separator and/or the separation film may be an organic/inorganic composite porous safety-reinforcing separators (SRS).

The SRS separator is produced by using inorganic particles and a binder polymer on a polyolefin-based separator base as an active layer component. At this time, the SRS separator has a uniform pore structure formed by an interstitial volume between inorganic material particles as the active layer component in addition to the pore structure included in the separator base itself.

The use of the organic/inorganic composite porous separator can suppress the increase in the cell thickness due to swelling during formation as compared with the use of the general separator, and it can also be used as an electrolyte when a gelable polymer is used as the binder polymer component when the liquefied electrolyte solution is impregnated.

In addition, since the organic/inorganic composite porous separator may exhibit excellent adhesive force characteristics by controlling the content of the inorganic material particles and the binder polymer which are the active layer component in the separator, such that the battery assembly process can be easily performed.

The inorganic material particles are not particularly limited as long as it is electrochemically stabilized. That is, the inorganic material particles usable in the present invention are not particularly limited as long as oxidation and/or reduction reaction does not occur in an operating voltage range (for example, 0 to 5 V based on Li/Li+) of the applied battery. Particularly, when inorganic material particles having ion transfer ability are used, the ion conductivity in the electrochemical device can be increased to improve performance, such that the ion conductivity is preferably as high as possible. In addition, when the inorganic particles have a high density, since it is difficult to disperse the particles at the time of coating, and there is a problem of increasing the weight at the time of the manufacturing of the battery, it is preferable to reduce the density if possible. Further, the inorganic material having a high dielectric constant contributes to increase the dissociation of an electrolyte salt, for example, a lithium salt in the liquefied electrolyte to improve the ion conductivity of the electrolyte solution.

The lithium salt is a material that can be well dissolved in the non-aqueous electrolyte, and examples thereof may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloro borane lithium, lower aliphatic carbonic acid lithium, 4 phenyl boric acid lithium, imide and the like.

In addition, for the purpose of improving charge/discharge characteristics, flame retardancy and the like, in the non-aqueous electrolyte solution, for example, pyridine, triethylphosphite, triethanolamine, cyclic ether, ethylene diamine, n-glyme, hexa phosphoric acid tri amide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, aluminum trichloride and the like may be added. In some cases, a halogen-containing solvent such as carbon tetrachloride or ethylene trifluoride may be further added to impart nonflammability, or a carbon dioxide gas may be further added to improve high temperature storage characteristics.

Meanwhile, an exemplary embodiment of the present invention provides a method for manufacturing a battery cell, the method including:

a) manufacturing an electrode assembly by interposing a separator between a cathode and an anode;

b) impregnating the electrode assembly manufactured in the step a) into a mixed liquid including an electrolyte solution component in the liquefied monomer and/or oligomer state and an polymerization initiator;

c) impregnating the electrode assembly in a battery case along with the liquefied electrolyte solution and then sealing the battery case; and polymerizing or curing the electrolyte solution component in the monomer and/or oligomer state inserted into a pore of the separator.

d) That is, the battery cell is formed by impregnating the electrode assembly manufactured by interposing the separator between the anode and the cathode into the mixed liquid including the electrolyte solution component in the liquefied monomer and/or oligomer state and the polymerization initiator and the polymerization initiator, and again impregnating the electrode assembly in the battery case together with the liquefied electrolyte solution and sealing the battery case, and the battery cell may be manufactured by polymerizing or curing the electrolyte solution component inserted into the pore of the separator by aging the battery cell.

If the separator is separately impregnated into the mixed liquid including the electrolyte solution component in the liquefied monomer and/or oligomer state and the polymerization initiator and then polymerized or cured, the process of assembling the electrode assembly having the separator interposed between the cathode and the anode may not easily performed due to the electrolyte solution component included in the separator.

On the other hand, the method for manufacturing a battery cell according to the present invention can more easily assemble the electrode assembly, thereby saving the cost and time required for the process, and further improving the structural stability of the electrode assembly.

At this time, the electrolyte solution component in the monomer and/or oligomer state inserted into the pores of the separator in step d) is sufficiently gelated and may be polymerized or cured for 1 to 20 hours in the temperature range of 40° C. to 90° C. so that it can be stably contained in the pores of the separator.

If the polymerization or curing process is performed over a short period of time at an excessively low temperature beyond the temperature and time in the above range, the electrolyte solution component in the monomer and/or oligomer state inserted into the pore of the separator can not be sufficiently gelated, whereas if the polymerization or curing process is performed over a long period of time at an excessively high temperature, it may act as a factor to lower the electrical performance of the battery cell.

Meanwhile, the method for manufacturing a battery cell may further include a degassing step for discharging the gas generated in the battery cell in the aging step for polymerization or curing of the electrolyte solution component.

The present invention also provides a battery pack including the battery cell and a device including the battery pack as a power source, wherein the device may be any one of a mobile phone, a tablet computer, a laptop computer, a power tool, a wearable electronic device, an electric vehicle, a hybrid electric vehicle, a plug-in hybrid electric vehicle, and a power storage device.

Since the battery pack and the devices are well known in the art, a detailed description thereof will be omitted herein.

DETAILED DESCRIPTION OF THE EMBODIMENTS

Hereinafter, the present invention will be described in detail with reference to the drawings according to embodiments of the present invention, but the scope of the present invention is not limited thereto.

Figure 1:
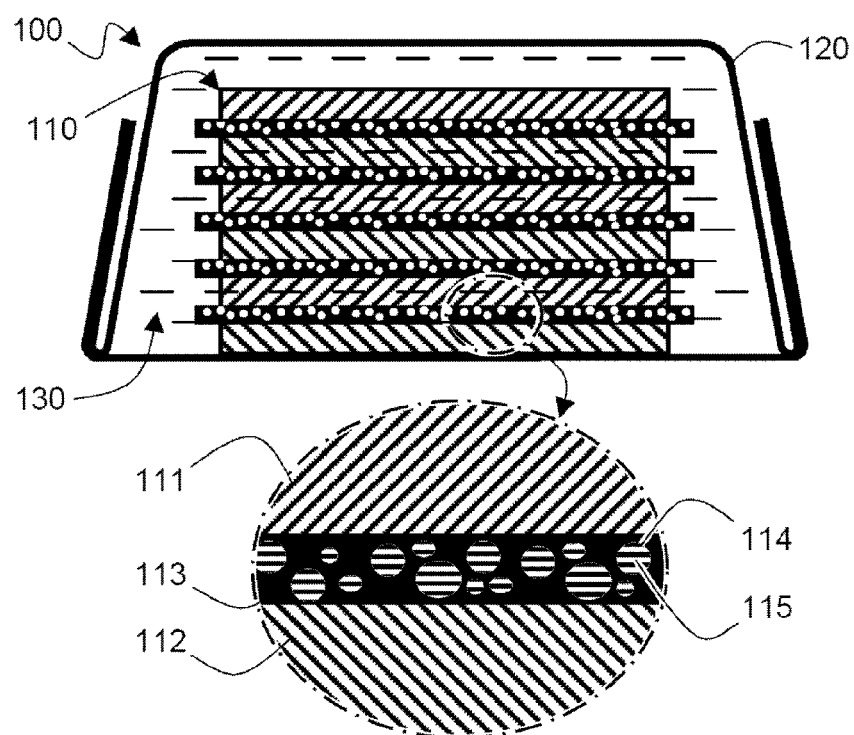
FIG. 1 is a schematic view schematically showing a structure of a battery cell according to one embodiment of the present invention.

FIG. 1 is a schematic view schematically showing a structure of a battery cell according to one embodiment of the present invention.

Referring to FIG. 1, a battery cell 100 includes an electrode assembly 110, in which the electrode assembly 110 is sealed in a battery case 120 while being impregnated into a liquefied electrolyte solution 130

The electrode assembly 110 has a structure in which a cathode 111 and an anode 112 are alternately stacked and a separator 113 is interposed between the cathode 111 and the anode 112.

A plurality of pores 114 are formed in the separator 113 and a gelation electrolyte solution component 115 is included in the pores 114

Therefore, even if the separator 113 having a large-diameter pore 114 is used, the gelation electrolyte solution component 115 included in the pore 114 can stably support the separator 113 to secure insulation between the cathode 111 and the anode 112 and improve structural stability.

The pores 114 may have different sizes when considering ease of fabrication, but are not limited thereto. The pores 114 may have the same size.

The pores 114 are formed separately, but are not limited thereto. The pores 114 may be connected to each other as a three-dimensional network structure, and may more stably support the separator 113 by the gelation electrolyte solution component 115 included in the pores 114.

Figure 2:
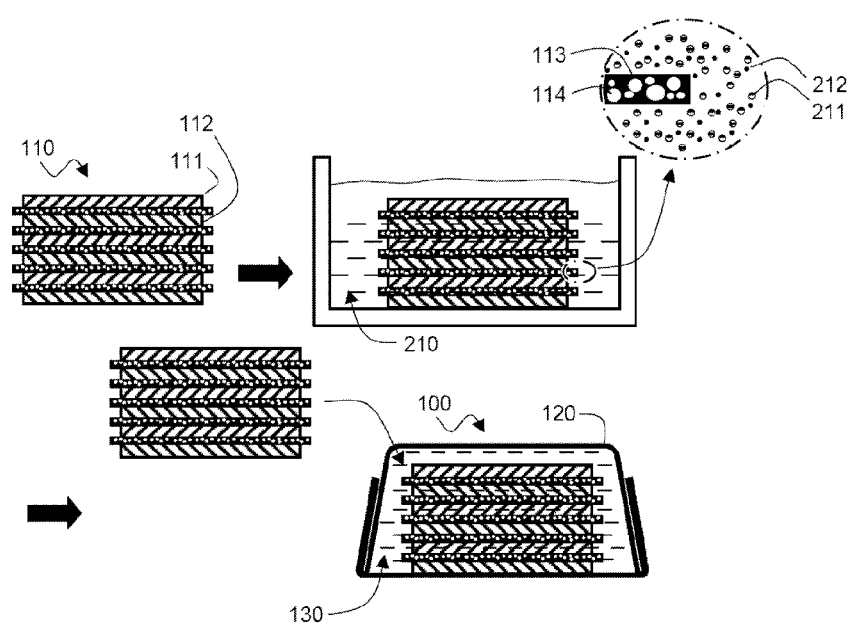
FIG. 2 is a schematic view schematically showing a process of manufacturing the battery cell of FIG. 1.

FIG. 2 is a schematic view schematically showing a process of manufacturing the battery cell of FIG. 1.

Referring to FIG. 2, the electrode assembly 110 is first impregnated into a mixed solution including an electrolyte solution component 211 in a liquefied monomer and/or oligomer state and a polymerization initiator 212.

Accordingly, the mixed liquid 210 may be sufficiently inserted into the plurality of pores 114 formed in the separator 113 of the electrode assembly 110.

Thereafter, the electrode assembly 110 in which the mixed liquid 210 is inserted into the pores 114 of the separator 113 is impregnated into the battery case 120 together with the liquefied electrolyte solution 130 and the battery case 120 is sealed, whereby the battery cell 100 is manufactured.

The battery cell 100 is aged at a temperature in the range of 40° C. to 90° C. for 1 hour to 20 hours so that the electrolyte solution component 211 in the liquefied monomer and/or oligomer state may be polymerized or cured, such that the gelation electrolyte solution component 115 can be stably included in the pores 114 of the separator 113.

It will be understood by those skilled in the art that various changes in form and details may be made therein without departing from the spirit and scope of the invention as defined by the appended claims.

INDUSTRIAL APPLICABILITY

As described above, the battery cell according to the present invention has a structure in which a gelation electrolyte solution component are included in a plurality of pores formed on a separator. By the structure, even if the separator having the large-diameter pore is used, the insulation between the cathode and the anode is improved to secure the safety of the battery cell and prevent the ion conductivity from deteriorating due to the closure of the pores, the high electrolyte solution impregnability is maintained to prevent the performance of the battery cell from deteriorating, and the separator from is prevented from being thermally contracted due to the change in temperature of the battery cell as compared to the structure including only the liquefied electrolyte solution to improve the stability.

The invention claimed is:

1. A battery cell, comprising:
a battery case in which an electrode assembly and a liquefied electrolyte solution are sealed and wherein the electrode assembly is impregnated in the liquefied electrolyte solution,
wherein the electrode assembly has a structure in which a separator is in direct physical contact with a cathode and an anode, wherein the separator has a plurality of pores and the pores include a gelation electrolyte solution component.

2. The battery cell of claim 1, wherein:
the pores formed in the separator have an average diameter of 0.01 μm to 100 μm.

3. The battery cell of claim 1, wherein:
the separator has porosity of 40% to 90%.

4. The battery cell of claim 1, wherein:
the gelation electrolyte solution component is formed by polymerizing or curing after the separator is impregnated in a mixed liquid including a liquefied electrolyte solution component in a liquefied monomer and/or oligomer state and an polymerization initiator so that the mixed liquid is inserted into the pores of the separator.

5. The battery cell of claim 4, wherein:
the liquefied electrolyte solution component in the liquefied monomer and/or oligomer state is at least any one selected from the group consisting of a polyethylene derivative, a polyethylene oxide derivative, a polypropylene oxide derivative, a phosphate ester polymer, a poly agitation lysine, a polyester sulfide, a polyvinyl alcohol, a polyvinylidene fluoride, and a polymer including an ionic dissociation group.

6. The battery cell of claim 4, wherein:
the liquefied electrolyte solution component includes at least any one selected from the group consisting of nitride, halide, and sulfate of Li.

7. The battery cell of claim 4, wherein:
the polymerization initiator gelates the liquefied electrolyte solution component in the liquefied monomer and/or oligomer state by heat or light applied from the outside.

8. The battery cell of claim 4, wherein:
the liquefied electrolyte solution component inserted into the pores of the separator is polymerized or cured for 1 hour to 20 hours in a temperature range of 40° C. to 90° C.

9. The battery cell of claim 4, wherein:
the polymerization initiator includes at least any one selected from the group consisting of benzoyl peroxide (BPO), acetyl peroxide, dilauryl peroxide, di-tertbutylperoxide, cumyl hydroperoxide, hydrogen peroxide, 2,2-azobis (2-cyanobutane), 2,2-azobis (methylbutyronitrile), azobis (isobutyronitrile) (AIBN), and azobis-dimethyl-valeronitrile (AMVN).

10. The battery cell of claim 4, wherein:
a content of the polymerization initiator is 0.01 wt % to 5 wt % with respect to the liquefied electrolyte solution component in the liquefied monomer and/or oligomer state.

11. The battery cell of claim 1, wherein:
the liquefied electrolyte solution includes at least any one selected from the group consisting of N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydroxy franc, 2-methyltetrahydrofuran, dimethylsulfoxide, 1,3-dioxolane, formamide, dimethylformamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, and ethyl propionate.

12. The battery cell of claim 1, wherein:
the battery cell is a lithium secondary battery.

13. A method for manufacturing the battery cell of claim 1, comprising:
a) manufacturing an electrode assembly by interposing a separator between a cathode and an anode;
b) impregnating the electrode assembly manufactured in the step a) into a mixed liquid including an liquefied electrolyte solution component in the liquefied monomer and/or oligomer state and an polymerization initiator;
c) impregnating the electrode assembly in a battery case along with a liquefied electrolyte solution and then sealing the battery case; and
d) polymerizing or curing the liquefied electrolyte solution component in the monomer and/or oligomer state inserted into a pore of the separator.

14. The method of claim 13, wherein:
the liquefied electrolyte solution component in the monomer and/or oligomer state inserted into the pores of the separator in step d) is polymerized or cured for 1 to 20 hours in the temperature range of 40° C. to 90° C.

15. A battery pack comprising the battery cell of claim 1.

16. A device comprising the battery pack of claim 15 as a power supply.

17. The device of claim 16, wherein:
the device a mobile phone, a tablet computer, a laptop computer, a power tool, a wearable electronic device, an electric vehicle, a hybrid electric vehicle, a plug-in hybrid electric vehicle, or a power storage device.

18. The battery cell of claim 4, wherein:
the liquefied electrolyte solution component includes at least any one selected from the group consisting $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

19. The battery cell of claim 1, wherein the plurality of pores include pores having an average diameter of greater than 10 μm to 100 μm.

20. The battery cell of claim 1, wherein the gelation electrolyte solution component is entirely in the separator.

* * * * *